(12) United States Patent
Resendes et al.

(10) Patent No.: US 7,915,333 B2
(45) Date of Patent: Mar. 29, 2011

(54) BUTYL RUBBER IONOMER NANOCOMPOSITES

(75) Inventors: Rui Resendes, Kingston (CA); Dana Adkinson, London (CA)

(73) Assignee: Lanxess Inc., Sarnia, Ontario (CA)

( * ) Notice: Subject to any disclaimer, the term of this patent is extended or adjusted under 35 U.S.C. 154(b) by 0 days.

(21) Appl. No.: 11/973,233

(22) Filed: Oct. 5, 2007

(65) Prior Publication Data

US 2008/0207815 A1 Aug. 28, 2008

Related U.S. Application Data

(60) Provisional application No. 60/876,662, filed on Dec. 22, 2006.

(51) Int. Cl.
*C08K 3/34* (2006.01)

(52) U.S. Cl. ...................................... 524/445

(58) Field of Classification Search .................. 524/445, 524/451
See application file for complete search history.

(56) References Cited

U.S. PATENT DOCUMENTS

| 2,356,128 A | 8/1944 | Thomas et al. ............... 260/79 |
| 4,649,178 A | 3/1987 | Gardner et al. .............. 525/306 |
| 6,696,518 B1 | 4/2004 | Dersch et al. ................ 524/560 |
| 7,019,063 B2 | 3/2006 | Wada et al. .................. 524/445 |

FOREIGN PATENT DOCUMENTS

| CA | 2 418 884 | 8/2004 |
| CA | 2 458 741 | 8/2005 |
| EP | 1 705 194 | 9/1996 |
| EP | 1 236 766 | 9/2002 |
| EP | 1 329 479 | 7/2003 |
| EP | 1 403 307 | 3/2004 |
| EP | 1 591 480 | 11/2005 |
| EP | 1 591 480 A1 * | 11/2005 |

OTHER PUBLICATIONS

Ullmanns Encyclopedia of Industrial Chemistry, vol. A 23, 1992, Fifth, Completely Revised Edition, pp. 288-295, "Rubber, 3. Synthetic".
Rubber Technology, 3$^{rd}$ Ed., edited by Maurice Morton, Kluwer Academic Publishers, pp. 297-300 "Halogenated Butyl".
Parent, J. Scott et al, Journal of Polymer Science, Part A: 43, 2005, pp. 5671-5679 Ion-Dipole Interaction Effects in Isobutylene-based Ammonium Bromide Ionomers.
Parent, J. Scott et al, Polymer 45 (2004) pp. 8091-8096 "Isobutylene-based ionomer composites: siliceous filler reinforcement".
Parent, J. Scott et al, Macromolecules 2004, 37, pp. 7477-7483 "Synthesis and Characterization of Isobutylene-Based Ammonium and Phosphonium Bromide Ionomers".
Singha, N.K.; Sivaram, S.; "A New Method to Hydrogenate Nitrile Rubber in the Latex Form" Rubber Chemistry and Technology, ACS, Akron, O, US. vol. 68, No. 2, 1 May 1, 1995.

* cited by examiner

*Primary Examiner* — Robert D. Harlan
(74) *Attorney, Agent, or Firm* — Michael A. Miller

(57) ABSTRACT

The invention relates to nanocomposites and processes for making nanocomposites comprising butyl rubber ionomers having at least 3.5 mol % of repeating units derived from a multiolefin monomer, such as isoprene. More particularly, the invention relates to butyl rubber ionomer nanocomposites comprising high aspect ratio fillers. In one preferred aspect of the invention, the nanocomposites comprise ionomers that are generated in situ during formation of the nanocomposite, leading to intercalation of the ionomer with the nanocomposite. Nanocomposites according to the present invention exhibit improved impermeability and tensile properties as compared with prior art nanocomposites made using conventional brominated butyl rubber.

27 Claims, No Drawings

BUTYL RUBBER IONOMER NANOCOMPOSITES

This application claims the benefit of U.S. Provisional Application Ser. No. 60/876,662, filed on Dec. 22, 2006.

FIELD OF THE INVENTION

The invention relates to nanocomposites and processes for making nanocomposites comprising butyl rubber ionomers having repeating units derived from a multiolefin monomer, such as isoprene. More particularly, the invention relates to butyl rubber ionomer nanocomposites comprising high aspect ratio fillers. In one preferred aspect of the invention, the nanocomposites comprise ionomers that are generated in situ during formation of the nanocomposite.

BACKGROUND

Poly(isobutylene-co-isoprene), or IIR, is a synthetic elastomer commonly known as butyl rubber which has been prepared since the 1940's through the random cationic copolymerization of isobutylene with small amounts of isoprene (1-2 mole %). As a result of its molecular structure, IIR possesses superior air impermeability, a high loss modulus, oxidative stability and extended fatigue resistance.

Butyl rubber is understood to be a copolymer of an isoolefin and one or more, preferably conjugated, multiolefins as comonomers. Commercial butyl comprise a major portion of isoolefin and a minor amount, not more than 2.5 mol %, of a conjugated multiolefin. Butyl rubber or butyl polymer is generally prepared in a slurry process using methyl chloride as a vehicle and a Friedel-Crafts catalyst as part of the polymerization initiator. This process is further described in U.S. Pat. No. 2,356,128 and Ullmanns Encyclopedia of Industrial Chemistry, volume A 23, 1993, pages 288-295.

CA 2,418,884 and 2,458,741 describe the preparation of butyl-based, peroxide-curable compounds which have high multiolefin content. Specifically, CA 2,418,884 describes the continuous preparation of IIR with isoprene levels ranging from 3 to 8 mol %. Halogenation of this high multiolefin butyl rubber produces a reactive allylic halide functionality within the elastomer. With these elevated levels of isoprene now available, it is possible, in principle, to generate BIIR analogues which contain allylic bromide functionalities ranging from 3 to 8 mol %. Conventional butyl rubber halogenation processes are described in, for example, Ullmann's Encyclopedia of Industrial Chemistry (Fifth, Completely Revised Edition, Volume A231 Editors Elvers, et al.) and/or "Rubber Technology" (Third Edition) by Maurice Morton, Chapter 10 (Van Nostrand Reinhold Company © 1987), particularly pp. 297-300.

The presence of allylic halide functionalities allows for nucleophilic alkylation reactions. It has been recently shown that treatment of brominated butyl rubber (BIIR) with nitrogen and/or phosphorus based nucleophiles, in the solid state, leads to the generation of IIR-based ionomers with interesting physical and chemical properties (see: Parent, J. S.; Liskova, A.; Whitney, R. A; Resendes, R. *Journal of Polymer Science, Part A*: Polymer Chemistry 43, 5671-5679, 2005; Parent, J. S.; Liskova, A.; Resendes, R. *Polymer* 45, 8091-8096, 2004; Parent, J. S.; Penciu, A.; Guillen-Castellanos, S. A.; Liskova, A.; Whitney, R. A. *Macromolecules* 37, 7477-7483, 2004). The ionomer functionality is generated from allylic halide sites in the BIIR. A greater quantity of multiolefin monomer in the butyl rubber used to produce the BIIR potentially leads to more allylic halide sites upon bromination and hence a greater quantity of ionomer functionality following nucleophilic substitution. The physical properties of ionomers generated from BIIR having a higher multiolefin content are superior to those of their non-ionomeric and/or low multiolefin counterparts.

Polymer nanocomposites is a rapidly expanding, multidisciplinary field that represents a radical alternative to conventional-filled polymers or polymer blends. Polymer nanocomposites are formed by the incorporation of nanosized inorganic fillers into a polymer matrix. Hybrid materials reinforced with neat and/or organically modified high aspect ratio plate-like fillers represent the most widely studied class of nanocomposites. Strong interfacial interactions between the dispersed layers and the polymer matrix lead to enhanced mechanical and barrier properties over the conventional composite. Among the many areas of polymer nanocomposites research, the tire industry has become particularly interested in high aspect ratio fillers. Recent studies have shown that the addition of high aspect ratio fillers in tire inner liner formulations have shown an increase in impermeability of up to 40% (see, for example, U.S. Pat. No. 7,019,063 B2).

Maximizing high aspect ratio fillers to their highest potential requires the correct morphology, making the selection of both the polymer and the filler critical. Polymer intercalation into the platelet galleries, delamination and exfoliation of the platelet and the anisotropic alignment of plates in the rubber matrix must be achieved. In order to accomplish at the very least the intercalation and delamination, it is advantageous to establish a chemical link between the polymer matrix and the filler surface.

Although it may be speculated that the charge properties of ionomers may be useful in establishing the desired chemical link, it is unclear to what extent this will result in improved physical properties in the nanocomposite articles. Although low multiolefin BIIR has been used in the above prior art to generate ionomers that have then been incorporated into nanocomposites, these nanocomposites were unvulcanized and did not benefit from the high degree of ionomeric functionality provided by having a high multiolefin content in the BIIR starting material. Experimental investigation is required to determine the effect of vulcanization and ionomer content on the tensile strength, cure reactivity and/or impermeability of cured nanocomposite articles.

SUMMARY OF THE INVENTION

According to an aspect of the invention, there is provided a cured polymer nanocomposite comprising: a butyl rubber ionomer comprising repeating units derived from at least one isoolefin monomer, at least 3.5 mol % of repeating units derived from at least one multiolefin monomer and at least one nitrogen or phosphorous based nucleophile; and, a high aspect ratio filler intercalated with the butyl rubber ionomer.

According to another aspect of the invention, there is provided a process for preparing a polymer nanocomposite comprising a butyl rubber ionomer generated in situ, the process comprising: providing a brominated butyl rubber polymer comprising repeating units derived from at least one isoolefin monomer, repeating units derived from at least one multiolefin monomer and an allylic bromide content of at least 0.5 mol %; adding a modifier comprising a nitrogen or phosphorous based nucleophile to the brominated butyl rubber polymer; adding a high aspect ratio filler; mixing the brominated butyl rubber polymer, the modifier and the filler to form an uncured nanocomposite comprising a butyl rubber ionomer intercalated with the filler; and, curing the nanocomposite.

According to yet another aspect of the invention, there is provided a process for preparing a polymer nanocomposite comprising a butyl rubber ionomer, the process comprising: providing a butyl rubber ionomer comprising repeating units derived from at least one isoolefin monomer, at least 3.5 mol % of repeating units derived from at least one multiolefin monomer and at least one nitrogen or phosphorous based nucleophile; adding a high aspect ratio filler; mixing the butyl rubber ionomer and the filler to form an uncured nanocomposite; and, curing the nanocomposite.

The present invention advantageously provides polymer nanocomposites having improved tensile strength, cure reactivity and/or gas impermeability as compared with prior art nanocomposites. The nanocomposites of the present invention are particularly useful in, for example, tire inner liner applications.

Further features of the invention will be described with reference to the following detailed description and experimental examples.

DETAILED DESCRIPTION

The butyl rubber ionomer is prepared from a halogenated butyl rubber polymer. Butyl rubber polymers are generally derived from at least one isoolefin monomer, at least one multiolefin monomer and optionally further copolymerizable monomers.

The butyl rubber polymer is not limited to a special isoolefin. However, isoolefins within the range of from 4 to 16 carbon atoms, preferably 4-7 carbon atoms, such as isobutene, 2-methyl-1-butene, 3-methyl-1-butene, 2-methyl-2-butene, 4-methyl-1-pentene and mixtures thereof are preferred. More preferred is isobutene.

The butyl rubber polymer is not limited to a special multiolefin. Every multiolefin copolymerizable with the isoolefin known by the skilled in the art can be used. However, multiolefins with in the range of from 4-14 carbon atoms, such as isoprene, butadiene, 2-methylbutadiene, 2,4-dimethylbutadiene, piperyline, 3-methyl-1,3-pentadiene, 2,4-hexadiene, 2-neopentylbutadiene, 2-methly-1,5-hexadiene, 2,5-dimethly-2,4-hexadiene, 2-methyl-1,4-pentadiene, 2-methyl-1,6-heptadiene, cyclopenta-diene, methylcyclopentadiene, cyclohexadiene, 1-vinyl-cyclohexadiene and mixtures thereof, preferably conjugated dienes, are used. Isoprene is more preferably used.

As optional monomers, any monomer copolymerizable with the isoolefins and/or dienes known by the skilled in the art can be used. α-methyl styrene, p-methyl styrene, chlorostyrene, cyclopentadiene and methylcyclopentadiene are preferably used. Indene and other styrene derivatives may also be used. β-pinene can also be used as a co-monomer for the isoolefin.

In one embodiment, the butyl rubber ionomer is prepared in situ from a butyl rubber polymer having from 1.5 to 2.2 mol % of the multiolefin monomer. In other embodiments, the ionomer is prepared either in situ or from a previously prepared butyl rubber polymer having a higher multiolefin content, for example greater than 2.5 mol %, preferably greater than 3.5 mol %, more preferably greater than 4.0 mol %. The preparation of a suitable high multiolefin butyl rubber polymer is described in co-pending application CA 2,418,884, which is incorporated herein by reference.

The butyl rubber polymer can then be subjected to a halogenation process in order to produce a halobutyl polymer. Bromination or chlorination can be performed according to the process known by those skilled in the art, for example, the procedures described in Rubber Technology, 3rd Ed., Edited by Maurice Morton, Kluwer Academic Publishers, pp. 297-300 and further documents cited therein.

During halogenation, some or all of the multiolefin content of the butyl polymer is converted to allylic halides. The allylic halides in the halobutyl polymer are therefore repeating units derived from the multiolefin monomers originally present in the butyl polymer. The total allylic halide content of the halobutyl polymer cannot exceed the starting multiolefin content of the parent butyl polymer.

The allylic halide sites of the halobutyl polymer can then be reacted with at least one nitrogen or phosphorus containing nucleophile according to the following formula,

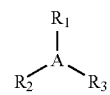

wherein:
A is a nitrogen or phosphorus; and,
$R_1$, $R_2$ and $R_3$ are selected from the group consisting of linear or branched $C_1$-$C_{18}$ alkyl substituents, an aryl substituent which is monocyclic or composed of fused $C_4$-$C_8$ rings, and/or a hetero atom selected from, for example, B, N, O, Si, P, and S.

In general, the appropriate nucleophile will contain at least one neutral nitrogen or phosphorus center which possesses a lone pair of electrons which is both electronically and sterically accessible for participation in nucleophilic substitution reactions. Suitable nucleophiles include trimethylamine, triethylamine, triisopropylamine, tri-n-butylamine, trimethylphosphine, triethylphosphine, triisopropylphosphine, tri-n-butylphosphine, and triphenylphosphine.

The amount of nucleophile reacted with the butyl rubber may be in the range of from 0.3 to 5 molar equivalents, more preferably 0.5 to 4 molar equivalents and even more preferably 1 to 3 molar equivalents based on the total molar amount of allylic halide present in the halobutyl polymer.

The halobutyl polymer and the nucleophile can be reacted for about 0.5 to 90 minutes. When the nanocomposite is produced in situ by reaction of allylic halides with nitrogen or phosphorous based nucleophiles in the presence of a high aspect ratio filler, the reaction time is surprisingly and advantageously reduced, for example to within the range of form 0.5 to 5 minutes, preferably from 1 to 3 minutes. In other cases, the reaction takes considerably longer, for example from 15 to 90 minutes, preferably 20 to 60 minutes. The reaction temperature when the nanocomposite is generated in situ is also much lower than in other cases; for example, a temperature in the range of from 25 to 80° C. is sufficient for in situ generated nanocomposite formation, whereas a temperature of from 80 to 200° C. is otherwise needed.

Since the nucleophile reacts with the allylic halide functionality of the halobutyl polymer, the resulting ionomeric moiety is a repeating unit derived from an allylic halide. The total content of ionomeric moiety in the butyl ionomer therefore cannot exceed the starting amount of allylic halide in the halobutyl polymer; however, residual allylic halides and/or residual multiolefins may be present. The resulting halobutyl based ionomer preferably possesses at least 0.5 mol %, preferably at least 0.75 mol %, more preferably at least 1.0 mol %, yet more preferably at least 1.5 mol % of the ionomeric moiety. Residual allylic halides may be present in an amount of from 0.1 mol % up to an amount not exceeding the original allylic halide content of the halobutyl polymer used to produce the butyl ionomer. Residual multiolefin may be present in an amount of from 0.1 mol % up to an amount not exceeding the original multiolefin content of the butyl polymer used to produce the halobutyl polymer. Typically, the residual multiolefin content of the ionomer is at least 0.4 mol %, preferably at least 0.6 mol %, more preferably at least 1.0 mol %, yet more preferably at least 2.0 mol %, still more preferably at least 3.0 mol %, even more preferably at least 4.0 mol %.

High aspect ratio fillers include clays, talcs, micas, etc. with an aspect ratio of at least 1:3. The fillers may include a circular or nonisometric materials with a platy or needle-like structure. The aspect ratio is defined as the ratio of mean diameter of a circle of the same area as the face of the plate to the mean thickness of the plate. The aspect ratio for needle and fiber shaped fillers is the ratio of length to diameter. Preferable high aspect ratio fillers have an aspect ratio of at least 1:5, more preferably at least 1:7, yet more preferably from 1:7 to 1:200. Fillers in accordance with the present invention have a mean particle size in the range of from 0.001 to 100 microns, preferably between 0.005 and 50 microns and more preferably between 0.01 and 10 microns. A suitable filler has a BET surface area, measured in accordance with DIN (Deutsche Industrie Norm) 66131, of between 5 and 200 square meters per gram. Examples of some preferred fillers and their properties are provided in Table 1 in comparison with typical prior art fillers having aspect ratios less than 1:3.

TABLE 1

| Filler | Mean particle size (microns) | Aspect ratio | Surface Area (m²/g) |
|---|---|---|---|
| Hi-Sil 233 ™ | 0.019 | 1:1 | 135 |
| Carbon Black N660 ™ | 0.067 | 1:1 | 36 |
| Polyfil 80 ™ | 2.3 | 1:7 | 8 |
| Mistron Vapor ™ | 2.2 | 1:5 | 13 |
| Mistron CB ™ | 3.7 | 1:5 | 13 |

A preferred embodiment of a high aspect ratio filler comprises a nanoclay, preferably an organically modified nanoclay. The present invention is not limited to a specific nanoclay; however, natural powdered smectite clays, such as sodium or calcium montmorillonite, or synthetic clays such as hydrotalcite and laponite are preferred as starting materials. Organically modified montmorillonite nanoclays are especially preferred. The clays are preferably modified by substitution of the transition metal for an onium ion, as is known in the art, to provide surfactant functionality to the clay that aids in the dispersion of the clay within the generally hydrophobic polymer environment. Preferred onium ions are phosphorus based (eg: phosphonium ions) and nitrogen based (eg: ammonium ions) and contain functional groups having from 2 to 20 carbon atoms (eg: $NR_4^+$ $^-MMT$).

The clays are preferably provided in nanometer scale particle sizes, preferrably less than 25 μm by volume, more preferably from 1 to 50 μm, still more preferably from 1 to 30 μm, yet more preferably from 2 to 20 μm.

In addition to silica, the preferred nanoclays may also contain some fraction of alumina. The nanoclays may contain from 0.1 to 10 wt % alumina, preferably 0.5 to 5 wt %, more preferably 1 to 3 wt % alumina.

Examples of preferred commercially available organically modified nanoclays suitable for use as high aspect ratio fillers according to the present invention are Cloisite® clays 10A, 20A, 6A, 15A, 30B, or 25A. Other examples of high aspect ratio fillers include Polyfil 80™, Mistron Vapor™ and Mistron CB™.

The high aspect ratio fillers are added to the nanocomposite in an amount of from 20 to 80 phr, more preferably from 30 to 70 phr, yet more preferably from 40 to 60 phr. The nanocomposite may be formed by adding the filler to the BIIR before reaction to form the ionomer, thereby creating an in situ ionomer nanocomposite, or may be formed by adding the filler to a pre-formed ionomer using conventional compounding techniques.

The ingredients of the nanocomposite may be mixed together using, for example, an internal mixer, such as a Banbury mixer, a miniature internal mixer, such as a Haake or Brabender mixer, or a two roll mill mixer. An extruder also provides good mixing, and permits shorter mixing times. It is possible to carry out the mixing in two or more stages, and the mixing can be done in different apparatus, for example one stage in an internal mixer and one stage in an extruder. However, it care should be taken so that no unwanted pre-crosslinking (also known as scorch, a pre-cursor to gel formation) occurs during the mixing stage. For further information on compounding techniques, see Encyclopedia of Polymer Science and Engineering, Vol. 4, p. 66 et seq. (Compounding).

The nanocomposite may be formed into a shaped article and is then cured. The preferred curing system is sulphur based. A typical sulfur-based curing system comprises: (i) a metal oxide, (ii) elemental sulfur and (iii) at least one sulfur-based accelerator. The use of metal oxides as a component in the curing system is well known in the art. A suitable metal oxide is zinc oxide, which is typically used in the amount of from about 1 to about 10, preferably from about 2 to about 5, parts by weight per hundred parts by weight butyl polymer in the nanocomposite. Elemental sulfur, comprising component (ii) of the preferred curing system is typically used in amounts of from about 0.2 to about 10 parts by weight per hundred parts by weight butyl polymer in the composition. Suitable sulfur-based accelerators (component (iii) of the preferred curing system) are typically used in amounts of from about 0.5 to about 3 parts by weight, per hundred parts by weight butyl polymer in the composition. Non-limiting examples of useful sulfur-based accelerators may be selected from the thiuram sulfides such as tetramethyl thiuram disulfide (TMTD), the thiocarbamates such as zinc dimethyl dithiocarbamate (ZDC) and the thiazyl and benzothiazyl compounds such as mercaptobenzothiazyl disulfide (MBTS). Preferably, the sulphur based accelerator is mercaptobenzothiazyl disulfide.

The cured article may contain further auxiliary products for rubbers, such as reaction accelerators, vulcanizing accelerators, vulcanizing acceleration auxiliaries, antioxidants, foaming agents, anti-aging agents, heat stabilizers, light stabilizers, ozone stabilizers, processing aids, plasticizers, tackifiers, blowing agents, dyestuffs, pigments, waxes, extenders, organic acids, inhibitors, metal oxides, and activators such as triethanolamine, polyethylene glycol, hexanetriol, etc., which are known to the rubber industry. The rubber aids are used in conventional amounts that depend, inter alia, on the intended use. The cured article may also contain mineral and/or non-mineral fillers. Conventional amounts are from 0.1 to 50 wt. %, based on rubber.

Further information on vulcanization processes may be obtained in Encyclopedia of Polymer Science and Engineering, Vol. 17, s. 666 et seq. (Vulcanization).

The following examples will be used to illustrate particular embodiments of the invention.

EXAMPLES

Equipment. Hardness and stress strain properties were determined with the use of an A-2 type durometer following ASTM D-2240 requirements. The stress strain data was generated at 23° C. according to the requirements of ASTM D-412 Method A. Die C dumbbells cut from 2 mm thick tensile sheets (formed in a press at 15,000 psi for a total of 30 minutes at 166° C.) were used. Unless otherwise specified, the ionomers were prepared in situ in a BR-82 Banbury (capacity 1602 g) at 30° C. and a speed of 77 rpm. $^1$H NMR spectra were recorded with a Bruker DRX 500 spectrometer (500.13 MHz) in $CDCl_3$ with chemical shifts referenced to tetramethylsilane. Permeability results were measured according to ASTM D-1434 with the use of an internal permeability tester, Model 1000 at 50/60 Hz and operating at 240 V (single phase), using ~0.5 mm sheets (formed in a press at 15,000 psi for 30 minutes at 166° C.) at 65.5° C. and 50 psig.

Materials. All reagents, unless otherwise specified, were used as received from Sigma-Aldrich (Oakville, Ontario). BIIR (LANXESS BB2030, LANXESS Inc.), Sunpar 2280 (R.E. Carroll Inc), Pentalyn A (Hercules), Vulkacit Mercapto MG/C (LANXESS Inc.), Vulkacit DM/C (LANXESS Inc.), Vulkacit ZBEC/C (LANXESS Inc.), Irganox 1010 (Ciba Specialty Chemicals Corp), Irganox 1076 (Ciba Specialty Chemicals Corp), Carbon Black N660 (Sid Richardson Carbon and Gas Companies), Mistorn Vapor (Luzenac), Mistron CB (Luzenac), Cloisite 15A (Southern Clay Products), Hi-Sil 233 (PPG Industries, Inc.) and Polyfil 80 (J. M. Huber Corporation) were used as received from their respective suppliers.

Example 1

Preparation of Butyl Rubber Containing 7.5 mol % of Isoprene

The following example illustrates our ability to produce, via a continuous process, a novel grade of IIR possessing an isoprene content of up to 8.0 mol % and Mooney viscosity (ML 1+8@125° C.) between 35 and 40 MU.

The monomer feed composition was comprised of 4.40 wt. % of isoprene (IP or IC5) and 25.7 wt. % of isobutene (IB or IC4). This mixed feed was introduced into the continuous polymerization reactor at a rate of 5900 kg/hour. In addition, DVB was introduced into the reactor at a rate of 5.4 to 6 kg/hour. Polymerization was initiated via the introduction of an $AlCl_3$/MeCl solution (0.23 wt. % of $AlCl_3$ in MeCl) at a rate of 204 to 227 kg/hour. The internal temperature of the continuous reaction was maintained between −95 and −100° C. through the use of an evaporative cooling process. Following sufficient residence within the reactor, the newly formed polymer crumb was separated from the MeCl diluent with the use of an aqueous flash tank. At this point, ca. 1 wt. % of stearic acid was introduced into the polymer crumb. Prior to drying, 0.1 wt. % of Irganox® 1010 was added to the polymer. Drying of the resulting material was accomplished with the use of a conveyor oven. Table 2 details the characteristics of the final material.

Example 2

Preparation of High Isoprene BIIR

To a solution of 7 kg of IIR with 7.5 mol % of 1,4 IP (see POS 1138) in 31.8 kg if hexanes and 2.31 kg of water in a 95 L reactor was added, with rapid agitation, 110 mL of elemental bromine. After 5 minutes, the reaction was terminated via the addition of a caustic solution comprised of 76 g of NaOH in 1 L of water. Following an additional 10 minutes of agitation, a stabilizer solution comprised of 21.0 g of epoxidized soya-bean oil and 0.25 g of Irganox 1076 in 500 mL of hexanes and one comprised of 47.0 g of epoxidized soya-bean oil and 105 g of calcium stearate in 500 mL of hexanes was added to the reaction mixture. After an additional 1 hour of agitation, the high IP BIIR was isolated by steam coagulation. The final material was dried to a constant weight with the use of a two roll 10"×20" mill operating at 100° C. The microstructure of the resulting material is presented in Table 3.

TABLE 2

| | |
|---|---|
| Isoprene Content (mol %) | 7.0-8.0 |
| DVB Content (mol %) | 0.07-0.11 |
| Mooney Viscosity (MU, ML1 + 8 @ 125° C.) | 35-40 |
| Gel Content (wt. %) | <5.0 |
| Mw (kg/mol) | 700-900 |
| Mn (kg/mol) | 100-105 |
| Mz (kg/mol) | 3200-5500 |
| Conversion (%) | 77-84 |

TABLE 3

| | |
|---|---|
| Total Unsats (mol %) | 5.34 |
| 1,4-Isoprene (mol %) | 4.19 |
| Branched Isoprene (mol %) | 0.32 |
| Allylic Bromide (mol %) | 0.71 |
| Conjugated Diene (mol %) | 0.04 |
| Endo Br (mol %) | 0.07 |

Example 3

Preparation of High Isoprene IIR Ionomer 226 g of Example 2 and 7.6 g (1.2 molar equivalents based on allylic bromide content of Example 2) of triphenylphosphine (TPP) were premixed on a 6"×12" mill at room temperature for 3 minutes. The mixture was then passed through a twin screw extruder operating at 160° C. and a speed of 20 rpm. Analysis of the final product by $^1$H NMR confirmed the complete conversion of all the allylic bromide of Example 2 to the corresponding ionomeric species. The resulting material was also found to possess 4.20 mol % of 1,4-IP.

Examples 4-8

The following examples illustrate the effect of an ionomer network (both phosphonium and ammonium-based and formed in situ) on the physical properties of a sulfur-cured, carbon black-filled system as compared to the physical properties of typical innerliner formulation with the same filler. Example 4 was prepared by mixing BB2030 and the filler in a Banbury mixer at 30° C. and a rotor speed of 77 rpm for 1 minute, followed by the addition of the oil and accelerator, mixed for an additional 4 minutes and then dumped. The curatives (sulfur, stearic acid and zinc oxide) were then added on a two roll 10"×20" mill and at room temperature. Examples 5-8 were prepared by mixing the rubber (either BB2030 or Example 2), half of the modifier (either TPP or N,N-dimethylethanolamine (DMEA)/hexamehtyidisilazane (HMDZ)) and half the filler in a Banbury mixer at 30° C. and a rotor speed of 77 rpm for 2 minutes. The amount of TPP modifier was 0.3 equivalents based on allylic bromide of BB2030 and 0.45 equivalents based equivalents based on allylic bromide of high IP BIIR (Example 2). The amount of DMEA modifier was 2.9 equivalents based on allylic bromide of BB2030 and 4.1 equivalents based equivalents based on allylic bromide of high IP BIIR (Example 2). The remaining modifier and filler were added and allowed to mix for an additional 3 minutes and then dumped. The compound and the curatives were then combined on a two roll 10"×20" mill at room temperature. The resulting formulations were cured and the tensile properties determined as described above. The results are tabulated in Table 4.

Table 4 illustrates that, in comparison to the standard innerliner formulation (Example 4), both the phosphonium (Examples 5 and 6) and ammonium ionomers (Examples 7 and 8) display improvements in tensile strength of up to 33%, in addition to increased reinforcement as displayed by M200/M50 values. Permeability of Example 4 is used for later comparison.

TABLE 4

| Example | 4 | 5 | 6 | 7 | 8 |
|---|---|---|---|---|---|
| BB2030 (PHR) | 100 | 100 | — | 100 | — |
| Example 2 (PHR) | — | — | 100 | — | 100 |
| TPP (PHR) | — | 1.2 | 1.2 | — | — |
| DMEA (PHR) | — | — | — | 3.2 | 3.2 |
| HMDZ (PHR) | — | — | — | 2.9 | 2.9 |
| Carbon Black N660 (PHR) | 60 | 60 | 60 | 60 | 60 |
| Pentalyn A (PHR) | 4 | — | — | — | — |
| Sunpar(PHR) | 7 | — | — | — | — |
| Vulkacit DM/C (PHR) | 1.3 | — | — | — | — |
| ZnO (PHR) | 1.5 | 1.5 | 1.5 | 1.5 | 1.5 |
| Stearic Acid (PHR) | 1 | 1 | 1 | 1 | 1 |
| Sulfur (PHR) | 0.5 | 0.5 | 0.5 | 0.5 | 0.5 |
| Hardness Shore A2 (pts.) | 51 | 51 | 55 | 53 | 57 |
| Ultimate Tensile (MPa) | 9.5 | 14.2 | 9.5 | 13.9 | 11.4 |
| Ultimate Elongation (%) | 761 | 436 | 291 | 255 | 220 |
| M200/M50 | 2.0 | 3.4 | 3.4 | 4.6 | 4.5 |
| Permeability (cm$^2$/atm · s) | $3.1 \times 10^{-8}$ | — | — | — | — |

Examples 9-13

The following examples illustrate the effect of an ionomer network (both phosphonium and ammonium-based and formed in situ) on the physical properties of a sulfur-cured, silica-filled system as compared to the physical properties of typical innerliner containing the same filler. Preparation of Example 9 and Examples 10-13 were carried out as described above for Example 4 and Examples 5-8, respectively. The resulting formulations were cured and the tensile properties determined as described above. The results are tabulated in Table 5.

Table 5 illustrates that, in comparison to the standard innerliner formulation (Example 9), both the phosphonium (Examples 10 and 11) and the ammonium ionomers (Examples 12 and 13) display improvements in tensile strength of up to 68%, in addition to increased reinforcement up to 70%.

TABLE 5

| Example | 9 | 10 | 11 | 12 | 13 |
|---|---|---|---|---|---|
| BB2030 (PHR) | 100 | 100 | — | 100 | — |
| Example 2 (PHR) | — | — | 100 | — | 100 |
| TPP (PHR) | — | 1.2 | 1.2 | — | — |
| DMEA (PHR) | — | — | — | 3.2 | 3.2 |
| HMDZ (PHR) | — | — | — | 2.9 | 2.9 |
| Hi Sil 233 (PHR) | 60 | 60 | 60 | 60 | 60 |

TABLE 5-continued

| Example | 9 | 10 | 11 | 12 | 13 |
|---|---|---|---|---|---|
| Pentalyn A (PHR) | 4 | — | — | — | — |
| Sunpar(PHR) | 7 | — | — | — | — |
| Vulkacit DM/C (PHR) | 1.3 | — | — | — | — |
| ZnO (PHR) | 1.5 | 1.5 | 1.5 | 1.5 | 1.5 |
| Stearic Acid (PHR) | 1 | 1 | 1 | 1 | 1 |
| Sulfur (PHR) | 0.5 | 0.5 | 0.5 | 0.5 | 0.5 |
| Hardness Shore A2 (pts.) | 67 | 75 | 51 | 51 | 64 |
| Ultimate Tensile (MPa) | 6.0 | 10.7 | 14.2 | 19.0 | 14.6 |
| Ultimate Elongation (%) | 887 | 507 | 436 | 705 | 416 |
| M200/M50 | 1.0 | 2.3 | 1.9 | 2.5 | 3.3 |

Examples 14-18

The following examples illustrate the effect of an ionomer network (both phosphonium and ammonium-based and formed in situ) on the physical properties of a sulfur-cured, Mistron CB-filled system as compared to the physical properties of typical innerliner containing the same filler. Preparation of Example 14 and Examples 15-18 were carried out as described above for Example 4 and Examples 5-8, respectively. The resulting formulations were cured and the tensile properties determined as described above. The results are tabulated in Table 6.

Table 6 illustrates that, in comparison to the standard innerliner formulation (Example 14), both the phosphonium (Example 15 and 16) and the ammonium ionomer (Example 17) display improvements in reinforcement as evidenced by the increased M200/M50 values of 29-39%. Permeation of these examples were determined as described above. Comparison to the permeation of the standard, carbon black-filled innerliner formulation (Example 4), whose permeation was determined to be $3.1 \times 10^{-8}$ cm$^2$/atm·s, an improvement of 29-55% was found, demonstrating the effect of the use of high aspect ratio fillers. Additionally, comparison of ionomers (Examples 15-19) to their non-ionomeric counterpart (Example 14) show an increase in impermeability of up to 41%, illustrating the effect of the ionomer filler interaction.

Examples 19-23

The following examples illustrate the effect of an ionomer network (both phosphonium and ammonium-based and formed in situ) on the physical properties of a sulfur-cured, Mistron Vapor-filled system as compared to the physical properties of typical innerliner containing the same filler. Preparation of Example 19 and Examples 20-23 were carried out as described above for Example 4 and Examples 5-8, respectively. The resulting formulations were cured and the tensile properties determined as described above. The results are tabulated in Table 7.

Table 7 illustrates that, in comparison to the standard innerliner formulation (Example 19), both the phosphonium (Examples 20 and 21) and the ammonium ionomer (Examples 22 and 23) display improvements in tensile strength of up to 30% and increased reinforcement of up to 39%. In addition to tensile properties, permeation of these examples were determined as described above. Comparison to the permeation of the standard, carbon black-filled innerliner formulation (Example 4) whose permeation was determined to be $3.1 \times 10^{-8}$ cm$^2$/atm·s, an improvement of 29-65% was found, demonstrating the effect of the use of high aspect ratio filler. Additionally, comparison of ionomers (Examples 20-23) to their non-ionomeric counterpart (Example 19) show an increase in impermeability of up to 41% illustrating the effect of the ionomer filler interaction.

TABLE 6

| Example | 14 | 15 | 16 | 17 | 18 |
|---|---|---|---|---|---|
| BB2030 (PHR) | 100 | 100 | — | 100 | — |
| Example 2 (PHR) | — | — | 100 | — | 100 |
| TPP (PHR) | — | 1.2 | 1.2 | — | — |
| DMEA (PHR) | — | — | — | 3.2 | 3.2 |
| HMDZ (PHR) | — | — | — | 2.9 | 2.9 |
| Mistron CB (PHR) | 60 | 60 | 60 | 60 | 60 |
| Pentalyn A (PHR) | 4 | — | — | — | — |
| Sunpar(PHR) | 7 | — | — | — | — |
| Vulkacit DM/C (PHR) | 1.3 | — | — | — | — |
| ZnO (PHR) | 1.5 | 1.5 | 1.5 | 1.5 | 1.5 |
| Stearic Acid (PHR) | 1 | 1 | 1 | 1 | 1 |
| Sulfur (PHR) | 0.5 | 0.5 | 0.5 | 0.5 | 0.5 |
| Hardness Shore A2 (pts.) | 35 | 42 | 46 | 48 | 51 |
| Ultimate Tensile (MPa) | 6.2 | 6.1 | 5.1 | 7.4 | 5.9 |
| Ultimate Elongation (%) | 860 | 469 | 261 | 426 | 153 |
| M200/M50 | 1.7 | 2.4 | 2.8 | 2.4 | — |
| Permeability (cm$^2$/atm · s) | $2.2 \times 10^{-8}$ | $1.5 \times 10^{-8}$ | $1.4 \times 10^{-8}$ | $1.7 \times 10^{-8}$ | $2.0 \times 10^{-8}$ |

TABLE 7

| Example | 19 | 20 | 21 | 22 | 23 |
|---|---|---|---|---|---|
| BB2030 (PHR) | 100 | 100 | — | 100 | — |
| Example 2 (PHR) | — | — | 100 | — | 100 |
| TPP (PHR) | — | 1.2 | 1.2 | — | — |
| DMEA (PHR) | — | — | — | 3.2 | 3.2 |
| HMDZ (PHR) | — | — | — | 2.9 | 2.9 |
| Mistron Vapor (PHR) | 60 | 60 | 60 | 60 | 60 |
| Pentalyn A (PHR) | 4 | — | — | — | — |
| Sunpar(PHR) | 7 | — | — | — | — |
| Vulkacit DM/C (PHR) | 1.3 | — | — | — | — |
| ZnO (PHR) | 1.5 | 1.5 | 1.5 | 1.5 | 1.5 |
| Stearic Acid (PHR) | 1 | 1 | 1 | 1 | 1 |
| Sulfur (PHR) | 0.5 | 0.5 | 0.5 | 0.5 | 0.5 |
| Hardness Shore A2 (pts.) | 35 | 36 | 42 | 44 | 52 |
| Ultimate Tensile (MPa) | 5.1 | 5.9 | 4.2 | 7.3 | 5.9 |
| Ultimate Elongation (%) | 932 | 823 | 540 | 614 | 224 |
| M200/M50 | 1.4 | 1.4 | 1.8 | 1.6 | 2.3 |
| Permeability (cm$^2$/atm · s) | $2.2 \times 10^{-8}$ | $1.3 \times 10^{-8}$ | $1.1 \times 10^{-8}$ | $1.5 \times 10^{-8}$ | $2.1 \times 10^{-8}$ |

Examples 24-28

The following examples illustrate the effect of an ionomer network (both phosphonium and ammonium-based and formed in situ) on the physical properties of a sulfur-cured, Polyfil 80-filled system as compared to the physical properties of typical innerliner containing the same filler. Preparation of Example 24 and Examples 25-28 were carried out as described above for Example 4 and Examples 5-8, respectively. The resulting formulations were cured and the tensile properties determined as described above. The results are tabulated in Table 8.

Table 8 illustrates that, in comparison to the standard innerliner formulation (Example 24), both the phosphonium (Examples 25 and 27) and the ammonium ionomer (Examples 26 and 28) display improvements in tensile strength and reinforcement of up to 46%. In addition to tensile properties, permeation of these examples were determined as described above. Comparison to the permeation of the standard, carbon black-filled innerliner formulation (Example 4) whose permeation was determined to be $3.1 \times 10^{-8}$ cm$^2$/atm·s, an improvement of 20-58% was found, once again demonstrating the effect of the use of high aspect ratio fillers.

Examples 29-30

The following examples illustrate the effect of pre-forming the ionomer as compared to making it in situ as describe above for Examples 5-8 on the physical properties of a sulfur-cured, Mistron CB-filled system. Example 29 was prepared as described for Example 4 with the exception of using the high isoprene IIR ionomer (Example 3) instead of BB2030. Example 30 was carried out as described above for Example 5, with the exception of using high isoprene BIIR (Example 2) instead of BB2030 and using 1.2 equivalents with respect to the allylic bromide of TPP. The resulting formulations were cured and the tensile properties determined as described above. The results are tabulated in Table 9.

Table 9 illustrates that the pre-formed ionomer has a tensile strength 31% greater than the ionomer formed in situ. Additionally, elongation increased by 27%, demonstrating the advantage of pre-forming the ionomer as we ensure the ionomer reaction has gone to completion before cure.

Described above is the production of novel butyl-based phosphonium and ammonium ionomer formed in a facile, solid state production, using conventional polymer processing equipment starting from both BIIR and high isoprene BIIR. The ionomer leads to products with reinforcement enhanced as compared to their non-ionomeric counterparts. The use of ionomers combined with high aspect ratio fillers such as organically modified montmorillonite nanoclay, Mistron® CB, Mistron® Vapor and Polyfil® 80, results in increased impermeability and increased mechanical properties as compared to traditional fillers such as silica and carbon black. Additionally, pre-forming the ionomer results in a product with superior properties when compared to ionomer made in situ. Given these advantages, the butyl-based ionomers described here would be valuable in making elastomer nanocomposites for use in tire inner liner formulations.

TABLE 8

| Example | 24 | 25 | 26 | 27 | 28 |
|---|---|---|---|---|---|
| BB2030 (PHR) | 100 | 100 | — | 100 | — |
| Example 2 (PHR) | — | — | 100 | — | 100 |
| TPP (PHR) | — | 1.2 | 1.2 | — | — |
| DMEA (PHR) | — | — | — | 3.2 | 3.2 |
| HMDZ (PHR) | — | — | — | 2.9 | 2.9 |
| Polyfil 80 (PHR) | 60 | 60 | 60 | 60 | 60 |
| Pentalyn A (PHR) | 4 | — | — | — | — |
| Sunpar(PHR) | 7 | — | — | — | — |
| Vulkacit DM/C (PHR) | 1.3 | — | — | — | — |
| ZnO (PHR) | 1.5 | 1.5 | 1.5 | 1.5 | 1.5 |
| Stearic Acid (PHR) | 1 | 1 | 1 | 1 | 1 |
| Sulfur (PHR) | 0.5 | 0.5 | 0.5 | 0.5 | 0.5 |
| Hardness Shore A2 (pts.) | 33 | 34 | 36 | 39 | 45 |
| Ultimate Tensile (MPa) | 5.1 | 5.3 | 4.6 | 9.4 | 5.7 |
| Ultimate Elongation (%) | 884 | 859 | 593 | 697 | 315 |
| M200/M50 | 1.3 | 1.3 | 1.9 | 1.7 | 2.4 |
| Permeability (cm$^2$/atm · s) | $2.3 \times 10^{-8}$ | $1.8 \times 10^{-8}$ | $1.3 \times 10^{-8}$ | $2.3 \times 10^{-8}$ | $2.1 \times 10^{-8}$ |

TABLE 9

| Example | 29 | 30 |
|---|---|---|
| Example 3 (PHR) | 100 | |
| Example 2 (PHR) | | 100 |
| TPP (PHR) | | 3.4 |
| Mistron CB (PHR) | 60 | 60 |
| Pentalyn A (PHR) | 4 | |
| Sunpar(PHR) | 7 | |
| Vulkacit ZBEC/C (PHR) | 1 | |
| Vulkacit Mercapto MG/C (PHR) | 2 | |
| ZnO (PHR) | 1.5 | 1.5 |
| Stearic Acid (PHR) | 1 | 1 |
| Sulfur (PHR) | 0.5 | 0.5 |
| Hardness Shore A2 (pts.) | 47 | 38 |
| Ultimate Tensile (MPa) | 4.9 | 3.44 |
| Ultimate Elongation (%) | 366 | 269 |
| M200/M50 | 2.4 | 2.7 |

Examples 31-33

The following examples illustrate the effect of a co-filler system of carbon black and talc on the physical properties of a sulfur-cured, pre-made ionomer system as compared to the physical properties of a sulfur-cured, talc-filled analogue. Examples 31-33 were prepared as described for Example 4 with the exception of using the high isoprene IIR ionomer (Example 3) instead of BB2030. The resulting formulations were cured and the tensile properties determined as described above. The results are tabulated in Table 10.

TABLE 10

| Example | 29 | 31 | 32 | 33 |
|---|---|---|---|---|
| Example 3 (PHR) | 100 | 100 | 100 | 100 |
| Carbon Black N660 (PHR) | | 10 | 20 | 30 |
| Mistron CB (PHR) | 60 | 50 | 40 | 30 |
| Pentalyn A (PHR) | 4 | 4 | 4 | 4 |
| Sunpar(PHR) | 7 | 7 | 7 | 7 |
| Vulkacit ZBEC/C (PHR) | 1 | 1 | 1 | 1 |
| Vulkacit Mercapto MG/C (PHR) | 2 | 2 | 2 | 2 |
| ZnO (PHR) | 1.5 | 1.5 | 1.5 | 1.5 |
| Stearic Acid (PHR) | 1 | 1 | 1 | 1 |
| Sulfur (PHR) | 0.5 | 0.5 | 0.5 | 0.5 |
| Hardness Shore A2 (pts.) | 47 | 39 | 43 | 45 |
| Ultimate Tensile (MPa) | 4.9 | 3.0 | 3.3 | 3.5 |
| Ultimate Elongation (%) | 366 | 262 | 318 | 340 |
| M200/M50 | 2.4 | 1.9 | 1.9 | 1.8 |

Table 10 illustrates that the addition of carbon black does not enhance the tensile properties of the composite.

Examples 34-36

The following examples illustrate the effect of a co-filler system of carbon black and talc as well as a co-polymer system of Example 2 (high isoprene BIIR) and Example 3 (high isoprene IIR Ionomer) on the physical properties of a sulfur-cured system as compared to the physical properties of a sulfur-cured, talc-filled analogue. Examples 34-36 were prepared by mixing Example 2 and Example 3 and the filler in a mini internal mixer at 60° C. and a rotor speed of 60 rpm for 1 minute, followed by the addition of filler for 1 min, followed by the addition of the oil and accelerator, mixed for an additional 4 minutes and then dumped. The curatives (sulfur, stearic acid and zinc oxide) were then added on a two roll 10"×20" mill and at room temperature. The resulting formulations were cured and the tensile properties determined as described above. The results are tabulated in Table 11.

TABLE 11

| Example | 29 | 34 | 35 | 36 | 33 |
|---|---|---|---|---|---|
| Example 2 (PHR) | | 50 | 50 | 50 | 100 |
| Example 3 (PHR) | 100 | 50 | 50 | 50 | |
| Mistron CB (PHR) | 60 | 50 | 40 | 30 | 30 |
| Carbon Black N660 (PHR) | — | 10 | 20 | 30 | 30 |
| Pentalyn A (PHR) | 4 | 4- | 4 | 4 | 4 |
| Sunpar(PHR) | 7 | 7 | 7 | 7 | 7 |
| Vulkacit ZBEC/C (PHR) | 1 | 1 | 1 | 1 | 1 |
| Vulkacit Mercapto MG/C (PHR) | 1.5 | 1.5 | 1.5 | 1.5 | 1.5 |

TABLE 11-continued

| Example | 29 | 34 | 35 | 36 | 33 |
|---|---|---|---|---|---|
| ZnO (PHR) | 1.5 | 1.5 | 1.5 | 1.5 | 1.5 |
| Stearic Acid (PHR) | 1 | 1 | 1 | 1 | 1 |
| Sulfur (PHR) | 0.5 | 0.5 | 0.5 | 0.5 | 0/5 |
| Hardness Shore A2 (pts.) | 47 | 48 | 50 | 51 | 45 |
| Ultimate Tensile (MPa) | 4.9 | 6.0 | 6.5 | 6.7 | 3.5 |
| Ultimate Elongation (%) | 366 | 478 | 510 | 478 | 340 |
| M200/M50 | 2.4 | 2.4 | 2.5 | 2.6 | 1.8 |
| Permeability ($cm^2$/atm·s) | $1.9 \times 10^{-8}$ | $2.1 \times 10^{-8}$ | $2.0 \times 10^{-8}$ | $2.5 \times 10^{-8}$ | |

Table 11 illustrates the advantage of both a co-filler system as well as a co-polymer system, where one polymer is a pre-formed ionomer (Examples 34-36) as compared to a compound filled with either talc (Example 29) or a combination of talc and carbon black (Example 33) and one polymer ionomer. Examples 34-36 display significant improvements in ultimate tensile and ultimate elongation are observed, while still retaining permeation values of $\leq 2.5 \times 10^{-8}$ $cm^2$/atm·s.

The invention claimed is:

1. A cured polymer comprising:
   a. a butyl rubber ionomer comprising repeating units derived from at least one isoolefin monomer, at least 3.5 mol % of repeating units derived from at least one multiolefin monomer and at least one nitrogen or phosphorous based nucleophile; and,
   b. a high aspect ratio filler having an aspect ratio in the range of from 1:3 to 1:200 intercalated with the butyl rubber ionomer, wherein the high aspect ratio filler is present in an amount of from 20 to 80 phr.

2. A cured polymer according to claim 1, wherein the isoolefin comprises isobutene and the multiolefin comprises isoprene.

3. A cured polymer according to claim 1, wherein the nitrogen based nucleophile comprises N,N-dimethylethanolamine (DMEA) and wherein the phosphorous based nucleophile comprises triphenylphosphine (TPP).

4. A cured polymer according to claim 1, wherein the filler comprises an organically modified montmorillonite nanoclay, talc, surfaced modified talc, calcined clay, or a combination thereof.

5. A cured polymer according to claim 1, wherein the filler has an aspect ratio of at least 1:3.

6. A cured polymer according to claim 1, wherein the cured polymer has a permeability of less than or equal to $2.5 \times 10^{-8}$ $cm^2$/atm·s.

7. A process for preparing a polymer cured polymer comprising a butyl rubber ionomer generated in situ, the process comprising:
   a. providing a brominated butyl rubber polymer comprising repeating units derived from at least one isoolefin monomer, repeating units derived from at least one multiolefin monomer and an allylic bromide content of at least 0.5 mol %;
   b. adding a modifier comprising a nitrogen or phosphorous based nucleophile to the brominated butyl rubber polymer;
   c. adding a high aspect ratio filler having an aspect ratio in the range of from 1:3 to 1:200, wherein the high aspect ratio filler is added in an amount of from 20 to 80 phr;
   d. mixing the brominated butyl rubber polymer, the modifier and the high aspect ratio filler to form an uncured nanocomposite comprising a butyl rubber ionomer intercalated with the high aspect ratio filler; and,
   e. curing the nanocomposite.

8. A process according to claim 7, wherein the filler comprises an organically modified montmorillonite nanoclay, talc, surfaced modified talc, calcined clay, or a combination thereof.

9. A process according to claim 7, wherein the filler has an aspect ratio of at least 1:3.

10. A process according to claim 7, wherein the modifier is a nitrogen based nucleophile comprising N,N-dimethylethanolamine (DMEA).

11. A process according to claim 10, wherein the modifier further comprises hexamethyldisilazane (HMDZ).

12. A process according to claim 10, wherein the modifier is present in an amount of from 0.3 to 5 molar equivalents to the amount of allylic bromide.

13. A process according to claim 7, wherein the modifier is a phosphorous based nucleophile comprising triphenylphosphine (TPP).

14. A process according to claim 13, wherein the modifier is present in an amount of from 0.3 to 1.2 molar equivalents to the amount of allylic bromide.

15. A process according to claim 7, wherein the curing is conducted using a sulfur based curing system.

16. A process for preparing a polymer comprising a butyl rubber ionomer, the process comprising:
   a. providing a butyl rubber ionomer comprising repeating units derived from at least one isoolefin monomer, at least 3.5 mol % of repeating units derived from at least one multiolefin monomer and at least one nitrogen or phosphorous based nucleophile;
   b. adding a high aspect ratio filler having an aspect ratio in the range of from 1:3 to 1:200, wherein the high aspect ratio filler is added in an amount of from 20 to 80 phr;
   c. mixing the butyl rubber ionomer and the high aspect ratio filler to form an uncured polymer; and,
   d. curing the polymer.

17. A process according to claim 16, wherein the filler comprises an organically modified montmorillonite nanoclay, talc, surfaced modified talc, calcined clay, or a combination thereof.

18. A process according to claim 16, wherein the filler has an aspect ratio of at least 1:3.

19. A process according to claim 16, wherein the uncured polymer comprises the filler intercalated with the butyl rubber ionomer.

20. A cured polymer according to claim 1, wherein the filler has a mean particle size in the range of from 0.001 to 100 microns.

21. A cured polymer according to claim 1, wherein the butyl rubber ionomer further comprises α-methyl styrene, p-methyl styrene, chlorostyrene, cyclopentadiene, methylcyclopentadiene, indene, and/or β-pinene.

22. The process according to claim 7, wherein the brominated butyl rubber polymer further comprises α-methyl styrene, p-methyl styrene, chlorostyrene, cyclopentadiene, methylcyclopentadiene, indene, and/or β-pinene.

23. The process according to claim 16, wherein the butyl rubber ionomer further comprises α-methyl styrene, p-methyl styrene, chlorostyrene, cyclopentadiene, methylcyclopentadiene, indene, and/or β-pinene.

24. The process according to claim 7, wherein the filler has an aspect ratio in the range of from 1:3 to 1:200.

25. The process according to claim 16, wherein the filler has an aspect ratio in the range of from 1:3 to 1:200.

26. The process according to claim 7, wherein the filler has a mean particle size in the range of from 0.001 to 100 microns.

27. The process according to claim 16, wherein the filler has a mean particle size in the range of from 0.001 to 100 microns.

* * * * *